US012781953B2

(12) United States Patent
Ono

(10) Patent No.: US 12,781,953 B2
(45) Date of Patent: Nov. 3, 2026

(54) LIGHT SOURCE MODULE WITH A PLURALITY OF HEAT DISSIPATION UNITS

(71) Applicant: NICHIA CORPORATION, Tokushima (JP)

(72) Inventor: Masato Ono, Sagamihara (JP)

(73) Assignee: NICHIA CORPORATION, Tokushima (JP)

( * ) Notice: Subject to any disclaimer, the term of this patent is extended or adjusted under 35 U.S.C. 154(b) by 0 days.

(21) Appl. No.: 19/225,432

(22) Filed: Jun. 2, 2025

(65) Prior Publication Data

US 2025/0377095 A1 Dec. 11, 2025

(30) Foreign Application Priority Data

Jun. 7, 2024 (JP) ................................ 2024-092808

(51) Int. Cl.

*F21V 29/71* (2015.01)
*F21S 45/48* (2018.01)

(Continued)

(52) U.S. Cl.

CPC ............ *F21V 29/713* (2015.01); *F21S 45/48* (2018.01); *F21V 17/04* (2013.01); *F21V 29/503* (2015.01);

(Continued)

(58) Field of Classification Search

CPC ...... F21V 29/713; F21V 29/76; F21V 29/763; F21V 29/75

See application file for complete search history.

(56) References Cited

U.S. PATENT DOCUMENTS

2009/0161354 A1* 6/2009 Hsu .......................... F21K 9/00 362/227
2010/0242519 A1* 9/2010 Breidenassel .......... F21V 29/74 165/185

(Continued)

FOREIGN PATENT DOCUMENTS

DE 202018100769 U1 * 5/2019 .............. F21S 45/49
EP 2770253 A1 * 8/2014 ......... F28D 15/0275

(Continued)

OTHER PUBLICATIONS

Matsumoto et al., Heat Sink, 2017, JP2017224768A , https://worldwide.espacenet.com/patent/search/family/060688272/publication/JP2017224768A?q=pn%3DJP2017224768A (Year: 2017).*

(Continued)

*Primary Examiner* — James R Greece
*Assistant Examiner* — Michael Chiang
(74) *Attorney, Agent, or Firm* — IPUSA, PLLC

(57) ABSTRACT

A light source module includes a laterally long light source unit including a plurality of light-emitting portions and extending in a first direction when viewed from a light-emitting surface of the light-emitting portion; a plurality of heat dissipation units formed of a metal material and attachable individually; and an attachment portion located between the light source unit and the heat dissipation units and provided with the heat dissipation units attached to the attachment portion. Each of the heat dissipation units includes two sidewall portions facing each other at a predetermined interval and a coupling portion coupling end portions of the sidewall portions on the same side to each other, and the coupling portion of each of the heat dissipation units is attached to the attachment portion so as to extend in a second direction perpendicular to the first (Continued)

direction when viewed from the light-emitting surface of the light-emitting portion.

14 Claims, 18 Drawing Sheets

(51) Int. Cl.

| | |
|---|---|
| ***F21V 17/04*** | (2006.01) |
| ***F21V 29/503*** | (2015.01) |
| ***F21V 29/75*** | (2015.01) |
| ***F21V 29/76*** | (2015.01) |
| ***F21V 29/89*** | (2015.01) |
| *F21Y 115/10* | (2016.01) |

(52) U.S. Cl.
CPC ............ *F21V 29/75* (2015.01); *F21V 29/763* (2015.01); *F21V 29/89* (2015.01); *F21Y 2115/10* (2016.08)

(56) References Cited

U.S. PATENT DOCUMENTS

| | | | | |
|---|---|---|---|---|
| 2011/0110087 | A1* | 5/2011 | Hochstein | F21V 29/83 362/249.02 |
| 2011/0198068 | A1* | 8/2011 | Chen | F21V 29/773 165/185 |
| 2019/0032909 | A1* | 1/2019 | Koga | B32B 1/00 |
| 2019/0059237 | A1* | 2/2019 | Johnson | H05B 45/20 |
| 2022/0049832 | A1* | 2/2022 | Stadler | F21S 45/47 |
| 2022/0107555 | A1* | 4/2022 | Tateishi | F21V 29/503 |
| 2023/0272898 | A1* | 8/2023 | Mochizuki | F21S 41/43 362/547 |
| 2025/0052387 | A1* | 2/2025 | Imamura | F21S 41/36 |
| 2025/0207749 | A1* | 6/2025 | Bhutani | F21S 41/143 |

FOREIGN PATENT DOCUMENTS

| | | | | |
|---|---|---|---|---|
| JP | 2008-130397 | | | 6/2008 |
| JP | 2012-064887 | | | 3/2012 |
| JP | 2012064887 | A | * | 3/2012 |
| JP | 2012-244106 | | | 12/2012 |
| JP | 2015-050158 | | | 3/2015 |
| JP | 2015-111540 | | | 6/2015 |
| JP | 2016-018767 | | | 2/2016 |
| JP | 2016-021279 | | | 2/2016 |
| JP | 2017-224768 | | | 12/2017 |
| JP | 2017224768 | A | * | 12/2017 |
| JP | 2025087125 | A | * | 6/2025 |

OTHER PUBLICATIONS

Sunamoto et al., Manufacturing Method of Heat Sink, 2012, JP2012064887A, https://worldwide.espacenet.com/patent/search/family/046060257/publication/JP2012064887A?q=pn%3DJP2012064887A (Year: 2012).*

* cited by examiner

1H

LIGHT SOURCE MODULE WITH A PLURALITY OF HEAT DISSIPATION UNITS

CROSS-REFERENCE TO RELATED APPLICATION

This application claims priority to Japanese Patent Application No. 2024-092808, filed on Jun. 7, 2024, the disclosure of which is hereby incorporated by reference in its entirety.

TECHNICAL FIELD

The present disclosure relates to a light source module.

BACKGROUND

There is known an illumination device including a light source unit on which a light source for emitting light is mounted, a heat sink table attached to the light source unit and provided with fin attachment portions at a plurality of sites different in positions or angles with respect to the light source, and at least one heat dissipation fin attached to the fin attachment portion of the heat sink table to dissipate heat generated from the light source.

SUMMARY

An object of the present disclosure is to improve heat dissipation of a light source module including a light-emitting portion.

A light source module according to an embodiment of the present disclosure includes a laterally long light source unit including a plurality of light-emitting portions and extending in a first direction when viewed from a light-emitting surface of the light-emitting portion; a plurality of heat dissipation units being formed of a metal member and being attachable individually; and an attachment portion being located between the light source unit and the heat dissipation units and being provided with the heat dissipation units attached to the attachment portion, in which each of the heat dissipation units includes two sidewall portions facing each other at a predetermined interval and a coupling portion coupling end portions of the sidewall portions on the same side to each other, and the coupling portion of each of the heat dissipation units is attached to the attachment portion so as to extend in a second direction perpendicular to the first direction when viewed from the light-emitting surface of the light-emitting portion.

According to an embodiment of the present disclosure, it is possible to improve heat dissipation of a light source module including a light-emitting portion.

DETAILED DESCRIPTIONS

Figure 1:
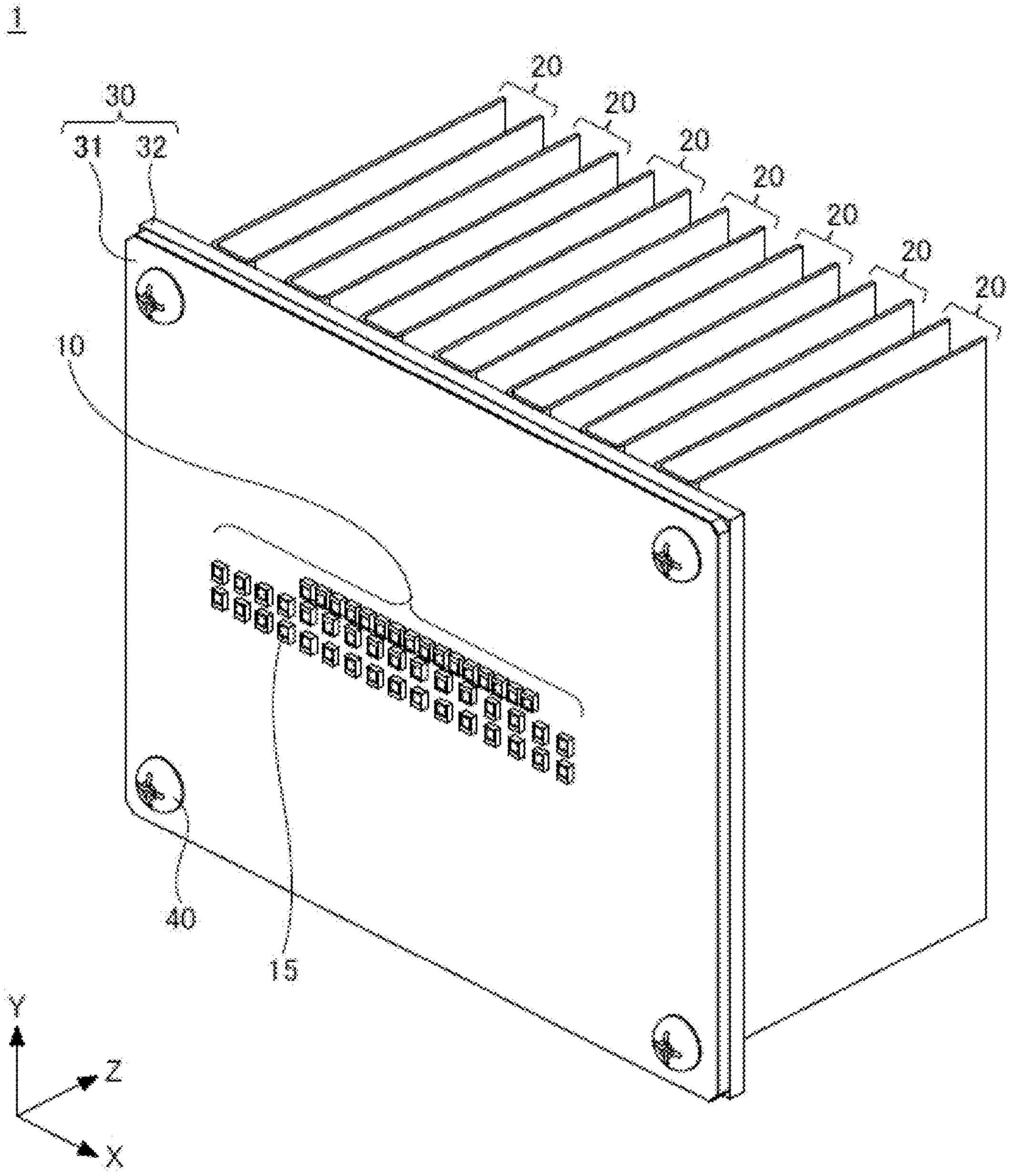
FIG. 1 is a perspective view schematically illustrating a light source module according to an illustrative embodiment.

A light source module according to the present disclosure (may be referred to as a "light source module according to an embodiment" hereinafter) will be described below with reference to the drawings. Note that, in the following description, terms indicating a specific direction or position (for example, "upper," "lower," "lateral," "horizontal," "vertical," and other terms related to those terms) are used as necessary. However, the use of those terms is to facilitate understanding of the invention with reference to the drawings, and the technical scope of the present disclosure is not limited by the meanings of those terms. Portions having the same reference characters appearing in multiple drawings indicate identical or equivalent portions or members.

Further, the following embodiments exemplify a light source module and the like for embodying a technical concept of the present invention, but the present invention is not limited to the description below. The dimensions, materials, shapes, relative arrangements, and the like of constituent components described below are not intended to limit the scope of the present invention to those alone, but are intended to provide an example, unless otherwise specified. The features of a particular embodiment can be applied to any of the other embodiments and modified examples. The sizes, the positional relationship, and the like of the members illustrated in the drawings may be exaggerated in order to clarify the explanation. Furthermore, in order to avoid excessive complication of the drawings, a schematic view in which some elements are not illustrated may be used, or an end view illustrating only a cutting surface may be used as a cross-sectional view.

Embodiment

A light source module according to the present disclosure includes a laterally long light source unit including a plurality of light-emitting portions and elongated in a first direction when viewed from a light-emitting surface of the light-emitting portion; a plurality of heat dissipation units being formed of a metal material and being attachable individually; and an attachment portion being located between the light source unit and the heat dissipation units and being provided with the heat dissipation units attached to the attachment portion. Each of the heat dissipation units includes two sidewall portions facing each other at a predetermined interval, and a coupling portion coupling end portions of the sidewall portions on the same side to each other. The coupling portion of each of the heat dissipation units is attached to the attachment portion so as to be elongated in a second direction perpendicular to the first direction when viewed from the light-emitting surface of the light-emitting portion.

Light Source Module 1

Figure 2:
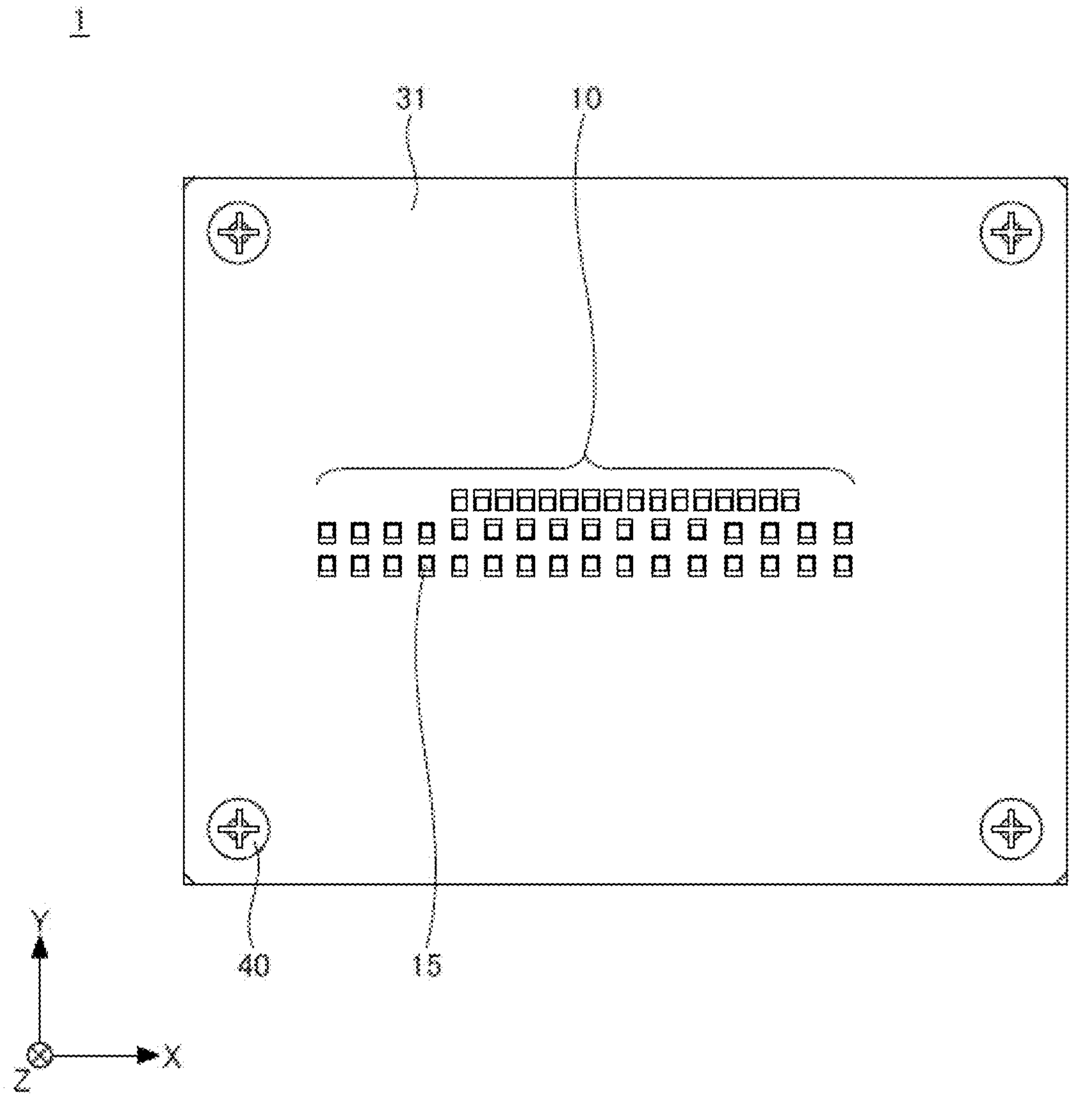
FIG. 2 is a front view schematically illustrating the light source module according to the embodiment.
Figure 3:
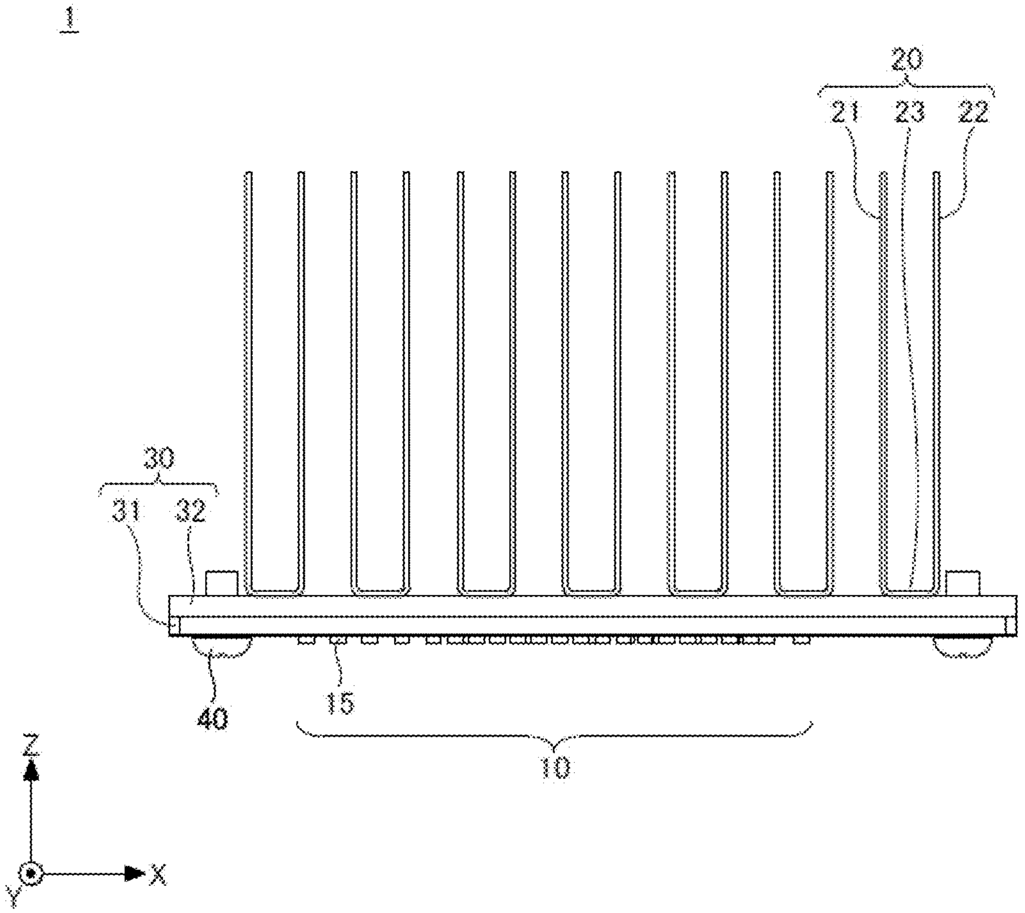
FIG. 3 is a top view schematically illustrating the light source module according to the embodiment.
Figure 4:
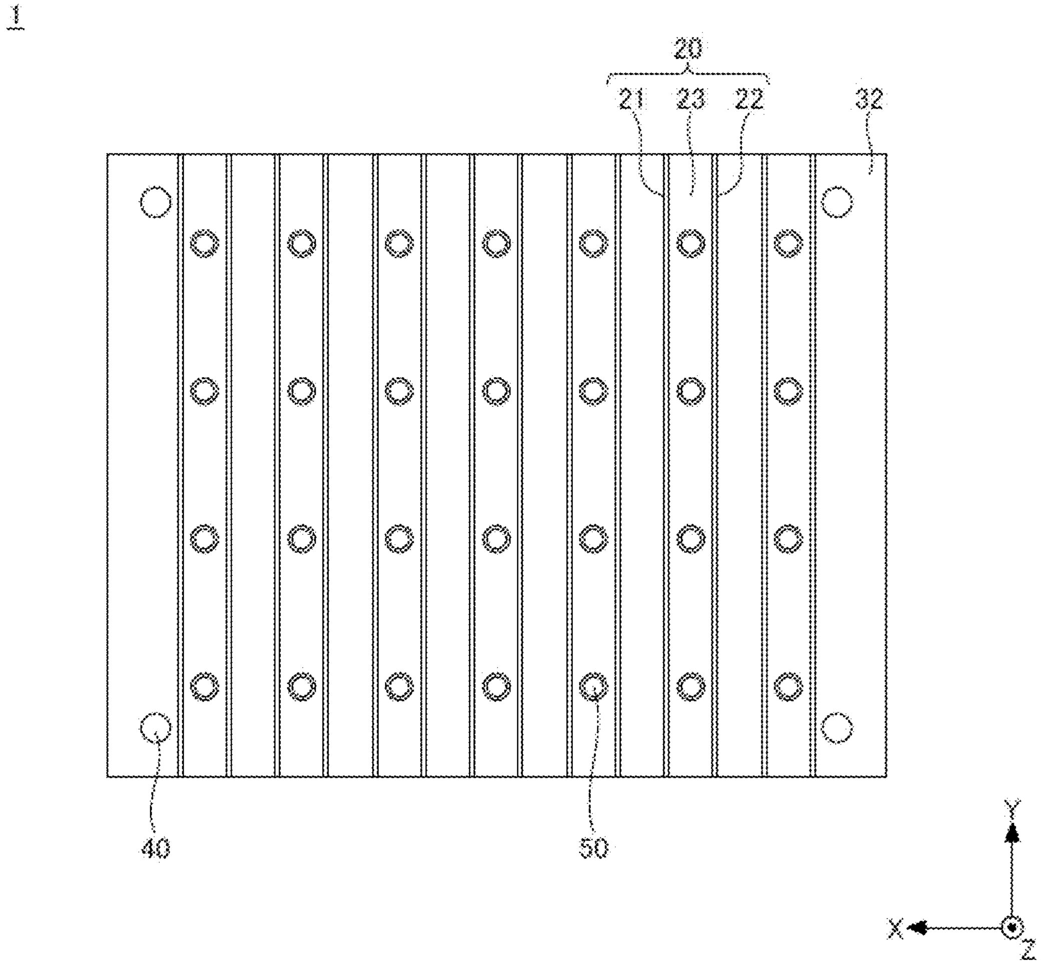
FIG. 4 is a back view schematically illustrating the light source module according to the embodiment.

A light source module 1 will be described as an example of the light source module according to the present disclosure. FIG. 1 is a perspective view schematically illustrating the light source module according to the present embodiment. FIG. 2 is a front view schematically illustrating the light source module according to the present embodiment. FIG. 3 is a top view schematically illustrating the light source module according to the present embodiment. FIG. 4 is a back view schematically illustrating the light source module according to the present embodiment.

Note that, in each of the drawings, an X-axis, a Y-axis, and a Z-axis, which are orthogonal to each other, are illustrated for reference as necessary. A direction parallel to the X-axis is referred to as a first direction X, a direction parallel to the Y-axis is referred to as a second direction Y, and a direction parallel to the Z-axis is referred to as a third direction Z. In addition, in the first direction X, a direction in which an arrow is directed is referred to as a +X direction, and a direction opposite to the +X direction is referred to as a −X direction. In the second direction Y, a direction in which an arrow is directed is referred to as a +Y direction, and a direction opposite to the +Y direction is referred to as a −Y direction. In the third direction Z, a direction in which an arrow is directed is referred to as a +Z direction, and a direction opposite to the +Z direction is referred to as a −Z direction. However, these expressions do not limit the orientation of the light source module during use, and the orientation of the light source module may be any chosen orientation.

As illustrated in FIGS. 1 to 4, the light source module 1 includes a light source unit 10, a plurality of heat dissipation units 20, and an attachment portion 30.

The light source unit 10 includes a plurality of light-emitting portions 15. The light-emitting surface of each of the light-emitting portions 15 is parallel to the XY plane, for example. The light source unit 10 has a laterally long shape elongated in the first direction X when viewed from the light-emitting surface of each of the light-emitting portions 15, that is, when viewed from the third direction Z. The pitches between adjacent light-emitting portions 15 may be uniform or do not have to be uniform in the first direction X and the second direction Y.

Each of the heat dissipation units 20 dissipates heat, which is generated when the light-emitting portions 15 emit light in the light source unit 10, to the surroundings. Each of the heat dissipation units 20 is formed of a metal material and can be attached individually. In the illustrated example, the light source module 1 includes seven heat dissipation units 20, but the number of heat dissipation units 20 may be any number of two or more.

The attachment portion 30 is located between the light source unit 10 and the heat dissipation units 20. The plurality of heat dissipation units 20 are attached to the attachment portion 30. In the illustrated example, the attachment portion 30 includes a substrate 31 on which the light-emitting portions 15 are mounted, and a metal plate 32 located on the opposite side of the surface of the substrate 31 on which the light-emitting portions 15 are mounted, and the heat dissipation units 20 are attached to the metal plate 32.

The substrate 31 and the metal plate 32 are polygons having substantially the same size when viewed from the third direction Z, and overlap in the third direction Z. In the illustrated example, the substrate 31 and the metal plate 32 have a rectangular shape whose long side direction is the first direction X, and are fixed to each other by four screws 40 arranged at four corners. Note that the substrate 31 and the metal plate 32 may have shapes other than a rectangular shape.

Each of the heat dissipation units 20 includes two sidewall portions 21 and 22 facing each other at a predetermined interval, and a coupling portion 23 coupling end portions of the sidewall portions 21 and 22 to each other on the same side. When viewed from the second direction Y, each of the heat dissipation units 20 is, for example, U-shaped. Here, the U-shape indicates that a portion connecting each of the sidewall portions 21 and 22 and the coupling portion 23 is bent when viewed from the second direction Y. The portion connecting each of the sidewall portions 21 and 22 and the coupling portion 23 may have a curvature or does not have to have a curvature. In the case in which it has a curvature, the magnitude of the curvature does not matter.

When viewed from the light-emitting surface of each of the light-emitting portions 15, the coupling portion 23 of each of the heat dissipation units 20 is attached to the attachment portion 30 so as to extend in the second direction Y perpendicular to the first direction X. The coupling portions 23 can each be attached to the metal plate 32 by, for example, a plurality of rivets 50 provided at a predetermined interval in the second direction Y. With such an attachment structure, the sidewall portions 21 and 22 of each of the heat dissipation units 20 are disposed extending in the second direction Y when viewed from the light-emitting surface of each of the light-emitting portions 15. In each of the heat dissipation units 20, the surfaces of the sidewall portions 21 and 22 facing each other are perpendicular to the first direction X, for example.

The plurality of light-emitting portions 15 can be driven individually or in groups. For example, the plurality of light-emitting portions 15 may be driven individually or in groups by using the substrate 31 being a semiconductor integrated circuit substrate such as an application specific integrated circuit (ASIC), or may be driven individually or in groups by an electric circuit provided outside the light source module 1.

Note that the expression "can be driven individually or in groups" includes a mode in which each of the plurality of light-emitting portions can be driven individually, a mode in which when the plurality of light-emitting portions are divided into groups, the plurality of light-emitting portions can be driven in groups, and a mode in which some light-emitting portions can be driven individually and some light-emitting portions can be driven in groups.

As described above, in the light source module 1, the light source unit 10 has a laterally long shape elongated in the first direction X when viewed from the light-emitting surface of each of the light-emitting portions 15. The sidewall portions 21 and 22 of each of the heat dissipation units 20 are arranged extending in the second direction Y perpendicular to the first direction X when viewed from the light-emitting surface of each of the light-emitting portions 15. Accordingly, the heat generated by the light source unit 10 can be spread in the +Y direction and the −Y direction orthogonal to the direction in which the light source unit 10 extends, and the heat of the light source unit 10 having a large amount of heat generation can be spread in the direction in which the light source unit 10 does not extend and the amount of heat generation is small. Therefore, the heat dissipation of the light source module 1 can be improved.

In addition, by improving the heat dissipation of the light source module 1, it is possible to suppress a temperature rise of the light-emitting portions 15 constituting the light source unit 10. As a result, the life of the light-emitting portions 15 can be extended. In addition, it is possible to reduce a characteristic change caused by a temperature rise of the light-emitting portions 15, and light can be stably emitted over a long period of time.

Each of the components of the light source module 1 will be described.

Light Source Unit, Light-Emitting Portion

The light-emitting portions 15 are each a member that emits light. The light-emitting portions 15 are each, for example, a light-emitting device in which one or a plurality of light-emitting elements are sealed with a light-transmissive resin or the like. The light-emitting portions 15 may each be a light-emitting element itself that emits light by itself. In addition, the light source unit 10 may be a light-emitting device in which a plurality of light-emitting elements that can be driven individually or in groups are collectively sealed with one light-transmissive resin or the like. In this case, in the light source unit 10, each light-emitting element and a portion positioned on the light-emitting element, such as a light-transmissive member, constitute one light-emitting portion 15.

The light-emitting portions 15 each include positive and negative electrodes on the same surface side. In this case, the upper surface positioned opposite to the surface where the electrodes are arranged serves as a light-emitting surface of each of the light-emitting portions 15. The electrodes of each of the light-emitting portions 15 are bonded by an electrically conductive bonding member on a wiring line disposed in the substrate 31, for example. A bump formed of a metal material such as Au, Ag, Cu, or Al can be used as a bonding member. Furthermore, a solder such as an AuSn-based alloy and an Sn-based lead-free solder may be used as the bonding member. In addition, an electrically conductive adhesive material including electrically conductive particles such as metal particles in a resin can be used as the bonding member. The bonding between each of the light-emitting portions 15 and the substrate 31 may be formed using a plating method. Examples of the plating material include Cu and Au. Regarding the electrodes of each of the light-emitting portions 15 and the wiring line of the substrate 31, the electrodes of each of the light-emitting portions 15 and the wiring line of the substrate 31 may be in direct contact with each other, without a bonding member interposed therebetween.

Note that, in the light source module 1, the light-emitting portions 15 are placed on the substrate 31 and aligned in rows at predetermined intervals in directions of a matrix. The size and number of the light-emitting portions 15 used can be selected as appropriate depending on the form of the desired light source module. In particular, the smaller and larger number of light-emitting portions 15 are preferably placed at a higher density. This makes it possible to control the irradiation range of light emitted from the light source module 1 with a larger number of divisions.

In a top view, the shape of the light-emitting element can be a square in which each side has a length in a range from 40 μm to 1000 μm, for example. For example, the light-emitting element includes positive and negative electrodes on the same surface side. In this case, the upper surface positioned opposite to the surface where the electrodes are arranged serves as a light-emitting surface of the light-emitting element.

For example, the light-emitting element is a light-emitting diode. The light-emitting element has a semiconductor structure. The semiconductor structure includes an n-side semiconductor layer, a p-side semiconductor layer, and an active layer interposed between the n-side semiconductor layer and the p-side semiconductor layer. The active layer may have a single quantum well (SQW) structure, or may have a multi quantum well (MQW) structure including a plurality of well layers. The active layer can emit visible light or ultraviolet light, for example.

The semiconductor structure may include a plurality of light-emitting portions each including an n-side semiconductor layer, an active layer, and a p-side semiconductor layer. When the semiconductor structure includes the plurality of light-emitting portions, the plurality of light-emitting portions may each include well layers having different light emission peak wavelengths or well layers having the same light emission peak wavelength. Note that having the same light emission peak wavelength includes a case in which there is a variation of about a few nm. The combination of the light emission peak wavelengths of the plurality of light-emitting portions can be selected as appropriate. For example, when the semiconductor structure includes two light-emitting portions, combinations of light emitted from the light-emitting portions include a combination of blue light and blue light, a combination of green light and green light, a combination of ultraviolet light and ultraviolet light, a combination of blue light and green light, a combination of blue light and ultraviolet light, and a combination of green light and ultraviolet light. For example, when the semiconductor structure includes three light-emitting portions, the combinations of light emitted from the light-emitting portions include a combination of blue light, green light, and red light. Each of the light-emitting portions may include one or more well layers having light emission peak wavelengths different from the light emission peak wavelengths of other well layers.

As the light-emitting element, for example, a light-emitting element that can emit blue light (light having a wavelength in a range from 430 nm to 490 nm) can be employed. However, regarding the color of the light emitted from the light-emitting element, any wavelength can be selected in accordance with the application. For example, examples of a light-emitting element that emits blue light (light having a wavelength in a range from 430 nm to 490 nm) and a light-emitting element that emits green light (light having a wavelength in a range from 495 nm to 565 nm) include a light-emitting element using a nitride-based semiconductor ($In_xAl_yGa_{1-x-y}N$ ($0 \le x$, $0 \le y$, $x+y \le 1$)), GaP, or the like.

Examples of a light-emitting element that emits red light (light having a wavelength in a range from 610 nm to 700 nm) include a light-emitting element using a nitride-based semiconductor element, and also a light-emitting element using GaAlAs, AlInGaP, or the like.

Heat Dissipation Unit

The heat dissipation units 20 are preferably formed of a material having high thermal conductivity such as aluminum, copper, or an alloy thereof. In particular, because aluminum has a lower density than copper, it is preferable that the heat dissipation units 20 be mainly formed of aluminum or an aluminum alloy from the viewpoint of reducing the weight of the light source module 1. Each of the heat dissipation units 20 can be produced by bending a single plate-like metal member by pressing or the like. The thickness of the plate-like metal member forming each of the heat dissipation units 20 may be, for example, about 1 mm or more and 3 mm or less.

As illustrated in FIG. 3, some of the heat dissipation units 20 are preferably arranged in the +X direction and the −X direction with respect to the arrangement region of the light source unit 10. Because the heat generated by the light source unit 10 is also transferred in the +X direction and the −X direction from the arrangement region of the light source unit 10, the heat dissipation is improved by arranging the heat dissipation units 20 at those positions.

As illustrated in FIG. 4, in each of the heat dissipation units 20, it is preferable that the coupling portion 23 extend from an end portion of the metal plate 32 in the +Y direction to an end portion thereof in the −Y direction. This can enlarge the sidewall portions 21 and 22 to increase the surface area of the heat dissipation unit 20, the heat generated in the light source unit 10 can further be spread in the +Y direction and the −Y direction from the vicinity of the light source unit 10, and the heat dissipation is improved.

Substrate

The substrate 31 is a member on which the light-emitting portions 15 constituting the light source unit 10 are arranged. The substrate 31 includes the wiring line for supplying power from the outside to the light-emitting portions 15, and a base material supporting the wiring line. As the base material, an insulating material through which light emitting from the light-emitting portions 15, external light, and the like are not readily transmitted is preferably used. As the base material, for example, a single material of a ceramic, such as aluminum oxide, aluminum nitride, silicon nitride, or mullite, a resin, such as an epoxy resin, a silicone resin, a modified epoxy resin, a urethane resin, a phenol resin, a polyimide resin, a BT resin, or polyphthalamide, a semiconductor, such as silicon, or a metal, such as copper or aluminum, or a composite material thereof can be used. Among these, as the base material, a ceramic, having excellent heat dissipation, is preferably used. The substrate 31 may be, for example, a semiconductor substrate of silicon or the like. For example, an integrated circuit board with an integrated circuit for driving and controlling the plurality of light-emitting portions 15 individually or in groups may be used as the substrate 31.

Metal Plate

The metal plate 32 is a member to which the heat dissipation units 20 are attached.

The metal plate 32 is preferably formed of a material having high thermal conductivity, such as aluminum, copper, or an alloy thereof. From the viewpoint of increasing the rigidity of the entire light source module 1, the thickness of the metal plate 32 is preferably greater than the thickness of the heat dissipation units 20.

The light source module 1 having the configuration described above can be used as a light source of a headlight of a vehicle, for example. For example, like a headlight having an adaptive driving beam (ADB) function, a road surface projection function, or the like, it can be used as a light source that can select an irradiation region and radiate light.

Figure 5:
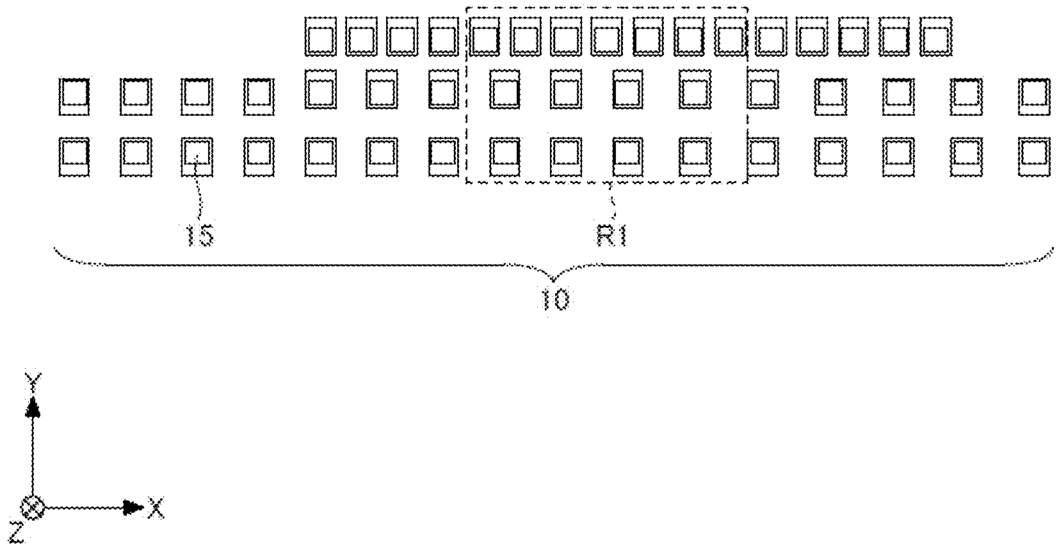
FIG. 5 is a diagram for describing a light source unit.

FIG. 5 is a diagram for describing a light source unit. As illustrated in FIG. 5, the light source unit 10 may include a first region R1 in which light with higher output can be extracted than in other regions in the light source unit 10. The first region R1 is a region in which light with higher output than light output from the outside of the first region R1 can be extracted by supplying more current to the light-emitting portions 15 disposed in the first region R1 than to the light-emitting portions 15 disposed outside the first region R1. When the light source unit 10 includes the light-emitting portions 15 having different outputs, the first region R1 may be a region in which the light-emitting portions 15 having a higher output are disposed. The position of the first region R1 is not limited to the central portion of the light source unit 10 and may be an end portion. The position of the first region R1 is a region in which light with higher output can be extracted in the light source unit 10 or a region in which more heat is generated in the light source unit 10. A thermal distribution of the light source unit 10 at the time of lighting may be measured by a thermographic camera or the like, and a region in which the amount of generated heat is 50% or more higher than in other regions in the light source unit 10 may be set as the first region R1. For example, when the light source module 1 is used as a light source of a headlight of a vehicle, the first region R1 can be disposed at a position corresponding to a high-luminance irradiation pattern such as a high beam.

The first region R1 generates a larger amount of heat than the other regions.

Therefore, it is preferable that the heat dissipation units 20 efficiently dissipate heat generated in the first region R1. For example, the heat dissipation units 20 may each include a peripheral region and a second region R2 having higher heat dissipation than the peripheral region, and may each include a portion where the first region R1 and the second region R2 overlap each other when viewed from the light-emitting surface of each of the light-emitting portions 15. Specific examples will be described below.

Figure 6:
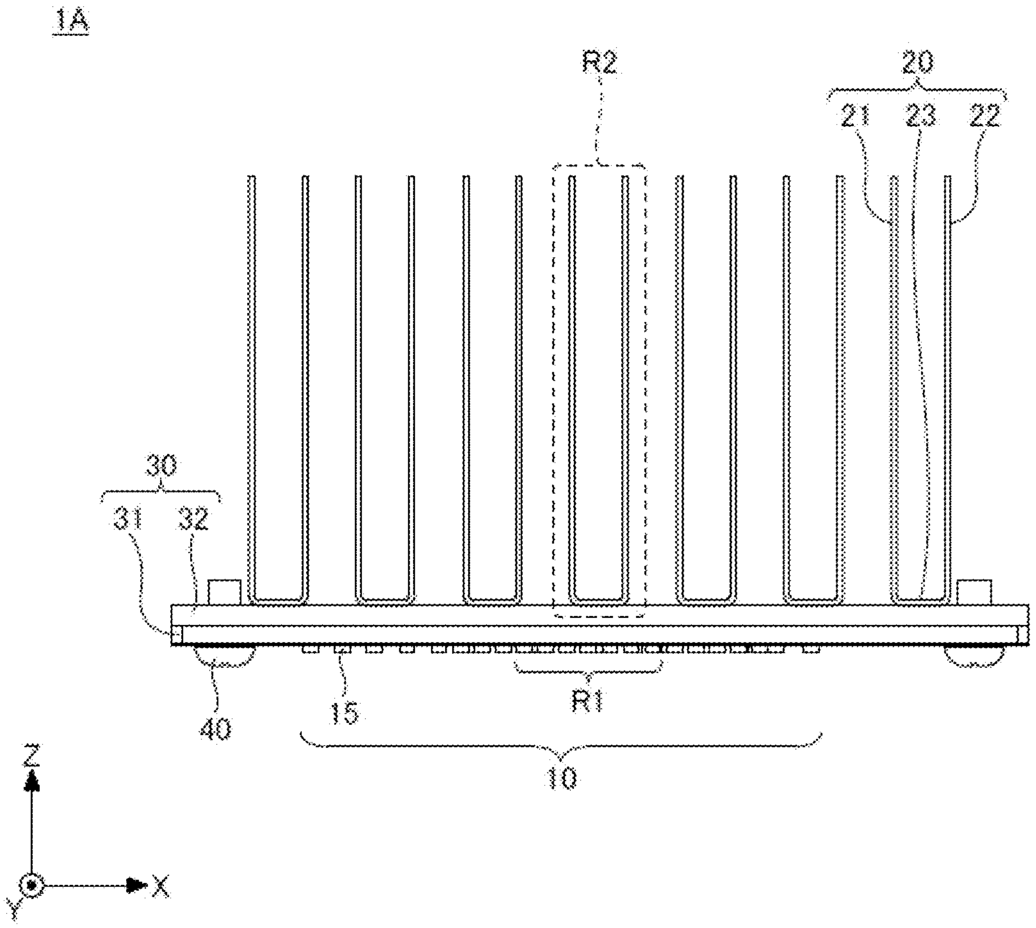
FIG. 6 is a top view schematically illustrating a light source module according to a modified example 1 of the embodiment.

FIG. 6 is a top view schematically illustrating a light source module according to a modified example 1 of the present embodiment. In a light source module 1A illustrated in FIG. 6, the heat dissipation unit 20 located in the second region R2 is formed of a material having a higher thermal conductivity than that of a material of the heat dissipation unit 20 located in the peripheral region. For example, the heat dissipation unit 20 located in the second region R2 can be formed of copper, and the heat dissipation unit 20 located in the peripheral region can be formed of aluminum.

According to the configuration of the modified example 1, because the thermal diffusion of the second region R2 can be made higher than that of the peripheral region, heat generated in the first region R1 can be efficiently dissipated from the second region R2. The number of heat dissipation units 20 formed of copper may be two or more. However, because copper has a higher density than aluminum, the light source module 1A becomes heavy when all the heat dissipation units 20 are formed of copper. Therefore, it is preferable that only the heat dissipation unit 20 located in the portion overlapping the first region R1 when viewed from the light-emitting surface of each of the light-emitting portions 15 be formed of copper.

Figure 7:
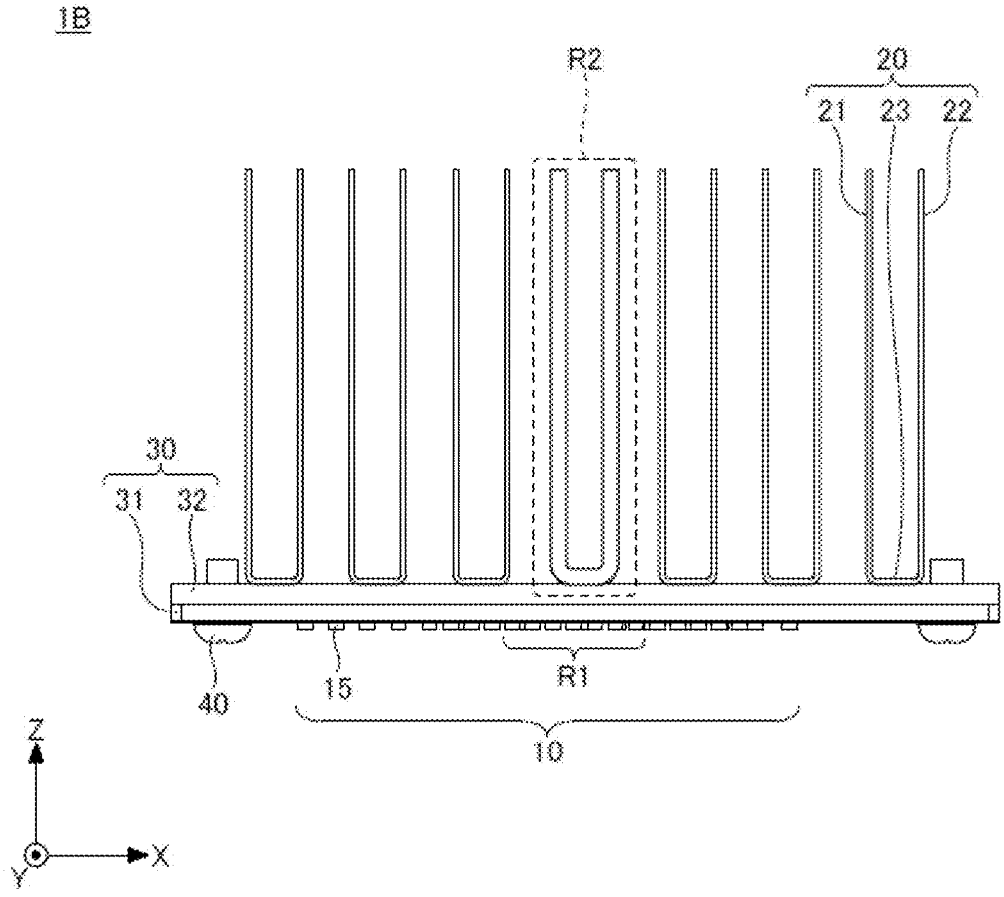
FIG. 7 is a top view schematically illustrating a light source module according to a modified example 2 of the embodiment.

FIG. 7 is a top view schematically illustrating a light source module according to a modified example 2 of the present embodiment. In a light source module 1B illustrated in FIG. 7, the thickness of the heat dissipation unit 20 located in the second region R2 is thicker than the thickness of the heat dissipation unit 20 located in the peripheral region. For example, the thickness of the heat dissipation units 20 located in the second region R2 can be about two times or more and three times or less the thickness of the heat dissipation unit 20 located in the peripheral region.

With the configuration of the modified example 2, because the thermal capacity of the second region R2 increases and the thermal diffusion of the second region R2 can be made higher than that of the peripheral region, heat generated in the first region R1 can be efficiently dissipated from the second region R2. The number of heat dissipation units 20 to be thickened may be two or more. However, when all the heat dissipation units 20 are made thick, the light source module 1B becomes heavy. Therefore, it is preferable to increase the thickness of only the heat dissipation unit 20 located in a portion overlapping the first region R1 when viewed from the light-emitting surface of each of the light-emitting portions 15.

Figure 8:
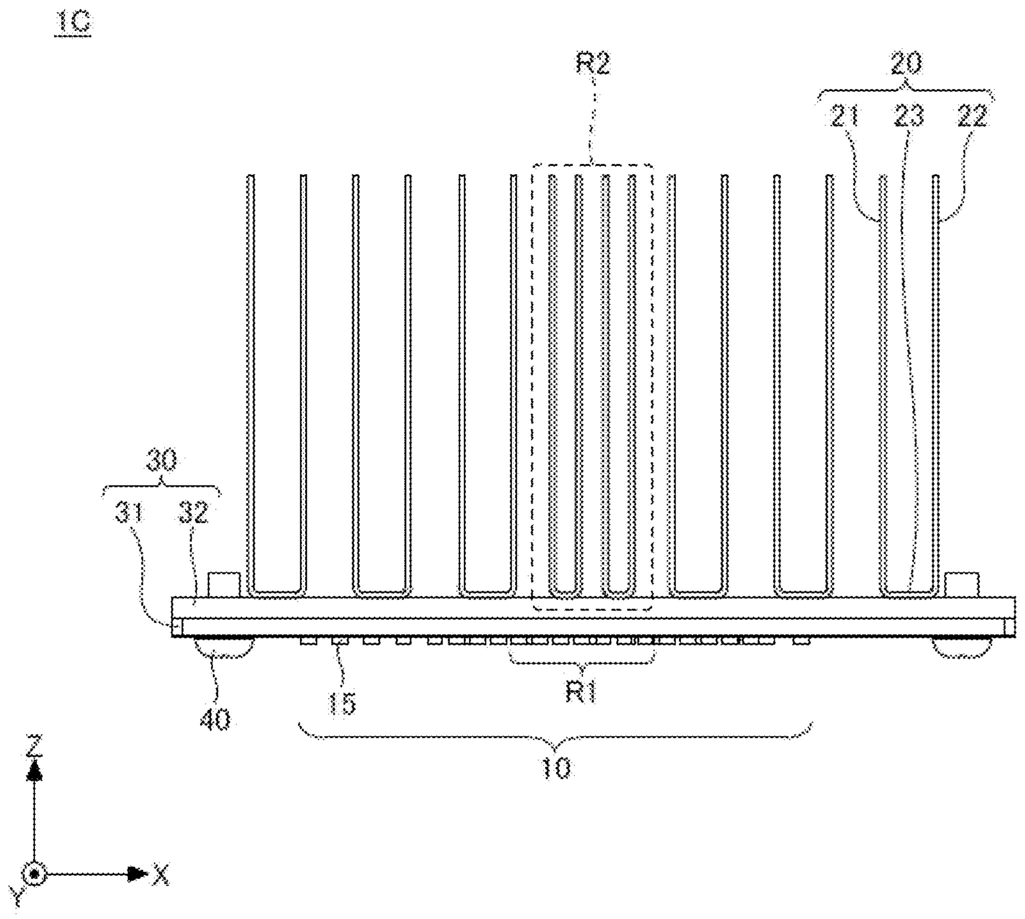
FIG. 8 is a top view schematically illustrating a light source module according to a modified example 3 of the embodiment.

FIG. 8 is a top view schematically illustrating a light source module according to a modified example 3 of the present embodiment. In a light source module 1C illustrated in FIG. 8, the interval between adjacent ones of the heat dissipation units 20 in the second region R2 is narrower than the interval between adjacent ones of the heat dissipation units 20 in the peripheral region. For example, the interval between the adjacent heat dissipation units 20 in the second region R2 may be set to ½ or less of the interval between the adjacent heat dissipation units 20 in the peripheral region, and the number of heat dissipation units 20 located in the second region R2 can be increased.

With the configuration of the modified example 3, because the thermal capacity of the second region R2 increases and the area of the heat dissipation surface in the second region R2 increases, heat generated in the first region R1 can be efficiently dissipated from the second region R2. However, when the pitch of all the heat dissipation units 20 is narrowed, the light source module 1C becomes heavy. Therefore, it is preferable to narrow the pitch of only the heat dissipation units 20 located in the portion overlapping the first region R1 when viewed from the light-emitting surface of each of the light-emitting portions 15.

Figure 9:
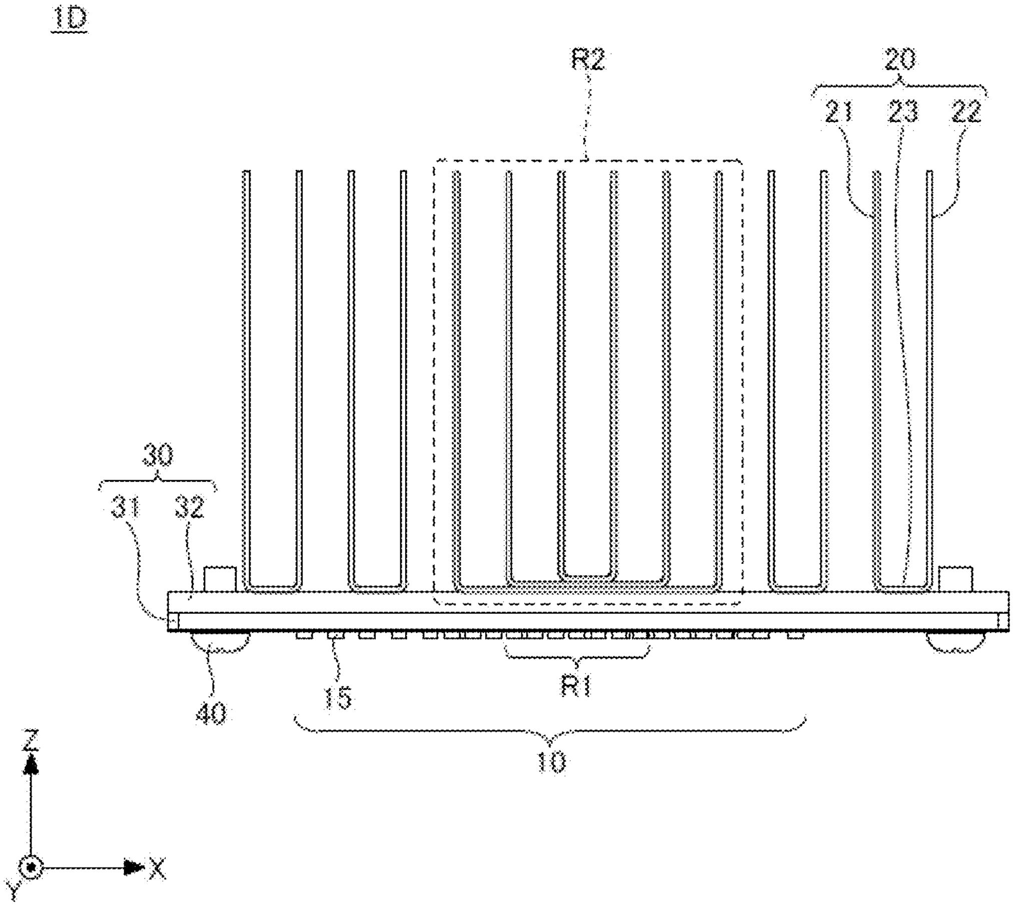
FIG. 9 is a top view schematically illustrating a light source module according to a modified example 4 of the embodiment.
Figure 10:
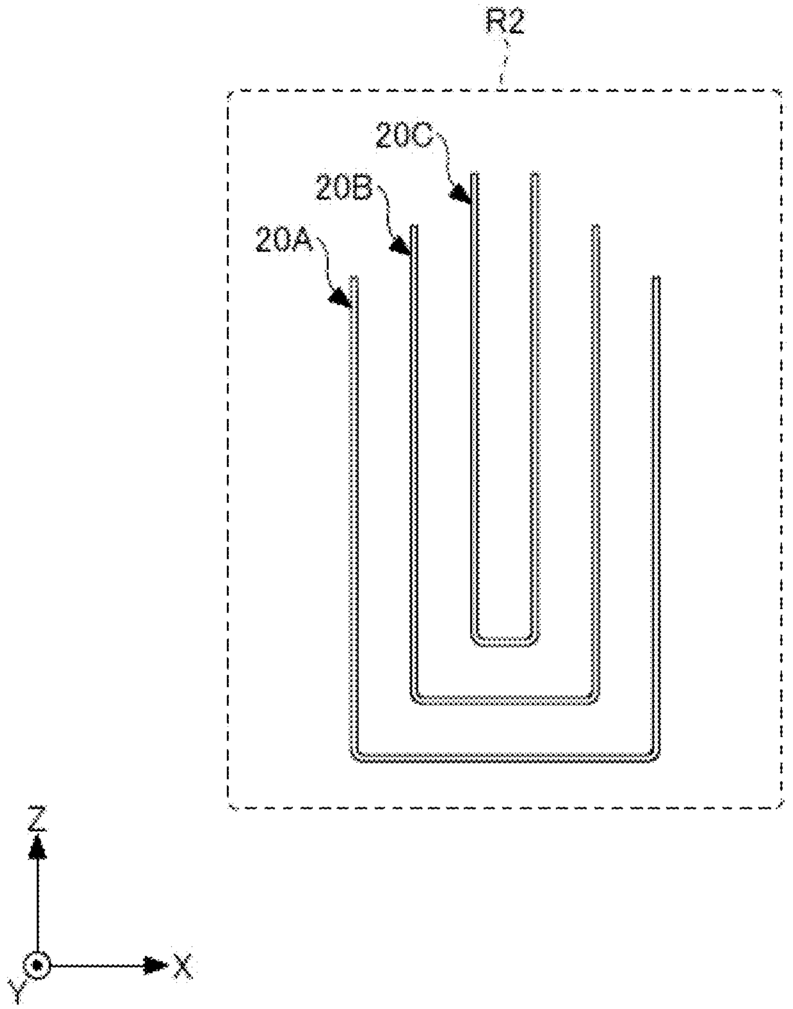
FIG. 10 is an exploded view of a heat dissipation unit located in a second region of FIG. 9.

FIG. 9 is a top view schematically illustrating a light source module according to a modified example 4 of the present embodiment. FIG. 10 is an exploded view of heat dissipation units located in the second region R2 of FIG. 9. In a light source module 1D illustrated in FIG. 9, as illustrated in FIG. 10, the plurality of heat dissipation units located in the second region R2 include a first heat dissipation unit 20A, a second heat dissipation unit 20B in which the interval between the facing sidewall portions is smaller than that of the first heat dissipation unit 20A, and a third heat dissipation unit 20C in which the interval between the facing sidewall portions is smaller than that of the second heat dissipation unit 20B. The coupling portion of the second heat dissipation unit 20B is disposed between the facing sidewall portions of the first heat dissipation unit 20A so as to overlap the coupling portion of the first heat dissipation unit 20A. In addition, the coupling portion of the third heat dissipation unit 20C is disposed between the facing sidewall portions of the second heat dissipation unit 20B so as to overlap the coupling portion of the second heat dissipation unit 20B.

The interval between the facing sidewall portions of the first heat dissipation unit 20A is, for example, about five times the interval between the sidewall portions of adjacent ones of the heat dissipation units 20. The interval between the facing sidewall portions of the second heat dissipation unit 20B is, for example, about three times the interval between the sidewall portions of adjacent ones of the heat dissipation units 20. The interval between the facing sidewall portions of the third heat dissipation unit 20C is, for example, equal to the interval between the sidewall portions of adjacent ones of the heat dissipation units 20. That is, in the second region R2, the sidewall portions can be arranged at equal intervals.

With the configuration of the modified example 4, because the thermal capacity of the second region R2 increases and the thermal diffusion of the second region R2 can be made higher than that of the peripheral region, heat generated in the first region R1 can be efficiently dissipated from the second region R2. From the viewpoint of improving the heat dissipation, it is preferable that the position where all the heat dissipation units located in the second region R2 overlap is at the center of the first region R1 or its vicinity. The number of heat dissipation units overlapping in the second region R2 may be any number equal to or greater than two.

Figure 11:
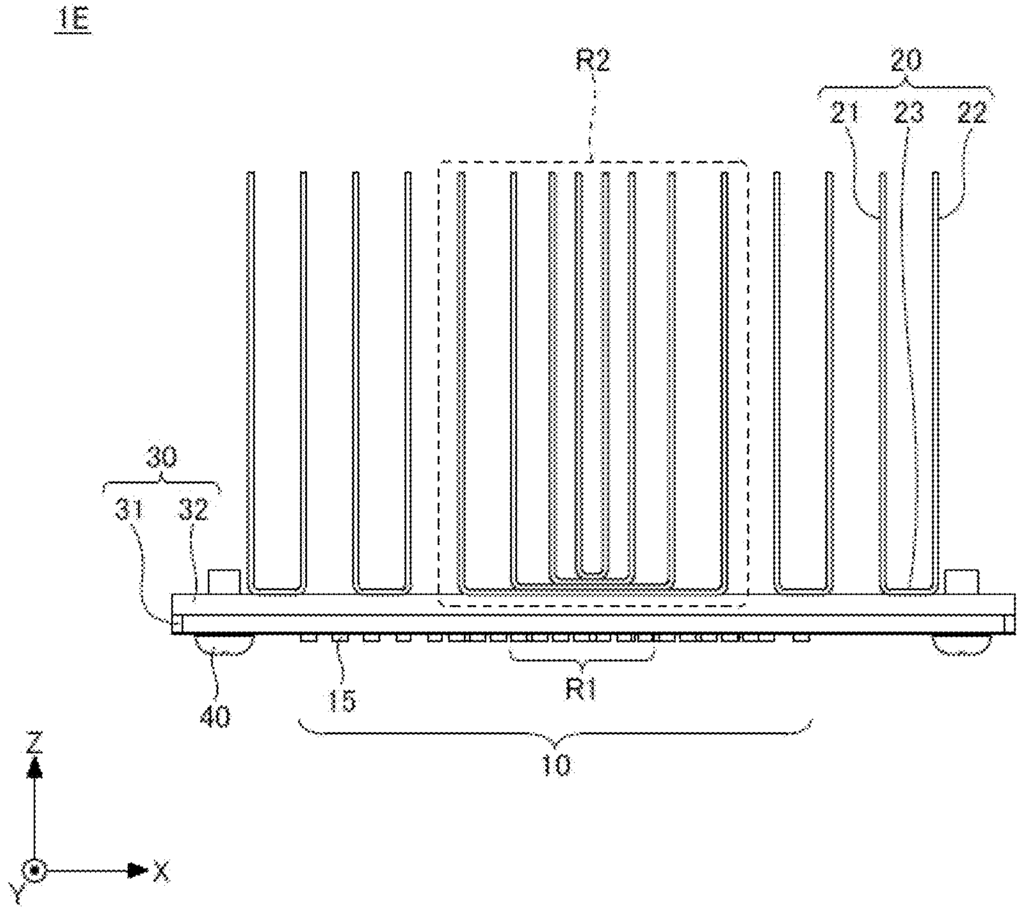
FIG. 11 is a top view schematically illustrating a light source module according to a modified example 5 of the embodiment.

FIG. 11 is a top view schematically illustrating a light source module according to a modified example 5 of the present embodiment. In a case in which a plurality of heat dissipation units are arranged in an overlapping manner, the heat dissipation units may be arranged in the second region R2 such that the interval between the sidewall portions decreases as the position is closer to the center of the first region R1, as in a light source module 1E illustrated in FIG. 11, from the viewpoint of further improving heat dissipation.

Figure 12:
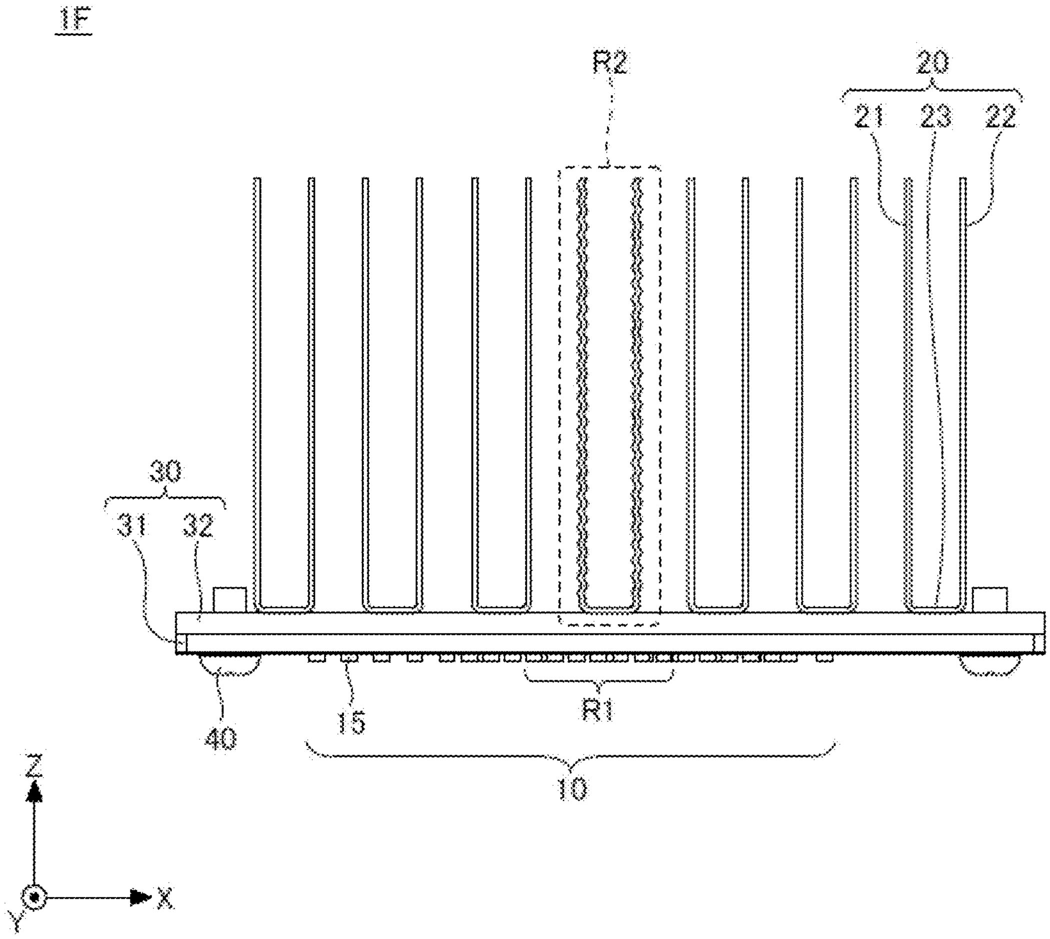
FIG. 12 is a top view schematically illustrating a light source module according to a modified example 6 of the embodiment.

FIG. 12 is a top view schematically illustrating a light source module according to a modified example 6 of the present embodiment. In a light source module 1F illustrated in FIG. 12, the sidewall portions of the heat dissipation unit 20 located in the second region R2 have protrusions and recessions on their surfaces.

With the configuration of the modified example 6, because the surface area of the heat dissipation surface of the heat dissipation unit 20 located in the second region R2 increases and the thermal diffusion of the second region R2 can be made higher than that of the peripheral region, heat generated in the first region R1 can be efficiently dissipated from the second region R2.

Figure 13:
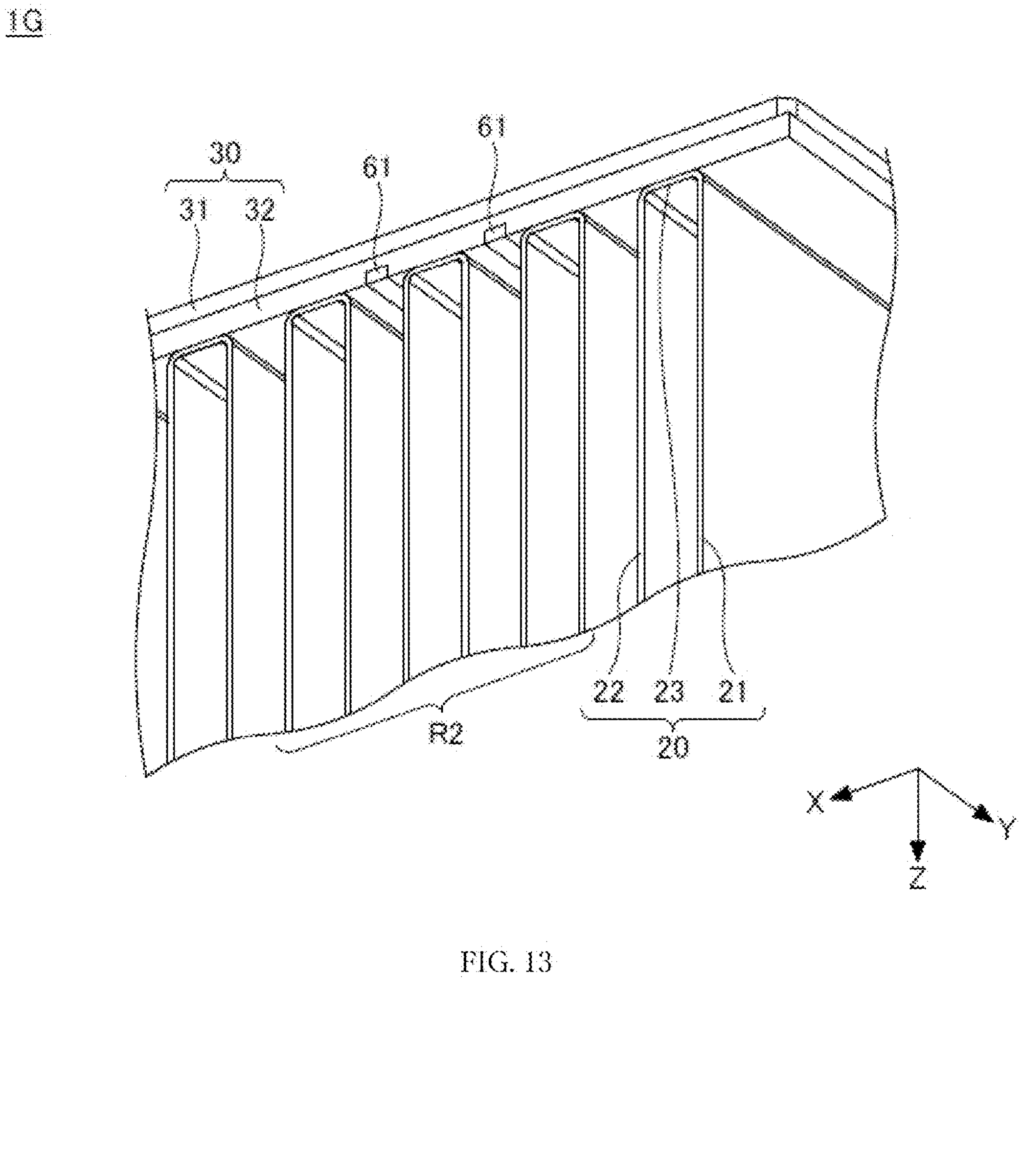
FIG. 13 is a partial perspective view schematically illustrating a light source module according to a modified example 7 of the embodiment.

FIG. 13 is a partial perspective view schematically illustrating a light source module according to a modified example 7 of the present embodiment, and partially illustrates an attachment portion and heat dissipation units. In a light source module 1G illustrated in FIG. 13, in the second region R2, recessed portions are provided in the metal plate 32 of the attachment portion 30 located between adjacent ones of the heat dissipation units 20, and a heat pipe 61 is disposed in each of the recessed portions. The heat pipe 61 is elongated in the Y direction.

With the configuration of the modified example 7, heat generated in the first region R1 can be further spread in the +Y direction and the −Y direction from the vicinity of the light source unit 10, and thus heat generated in the first region R1 can be efficiently dissipated from the second region R2. When the heat pipe 61 has protrusions and recessions and is disposed on the contact surface between the metal plate 32 and the coupling portion 23 of each of the heat dissipation units 20, heat transfer worsens. Therefore, it is preferable that the heat pipe 61 be disposed between adjacent ones of the heat dissipation units 20 so as not to be in contact with the coupling portion 23.

Figure 14:
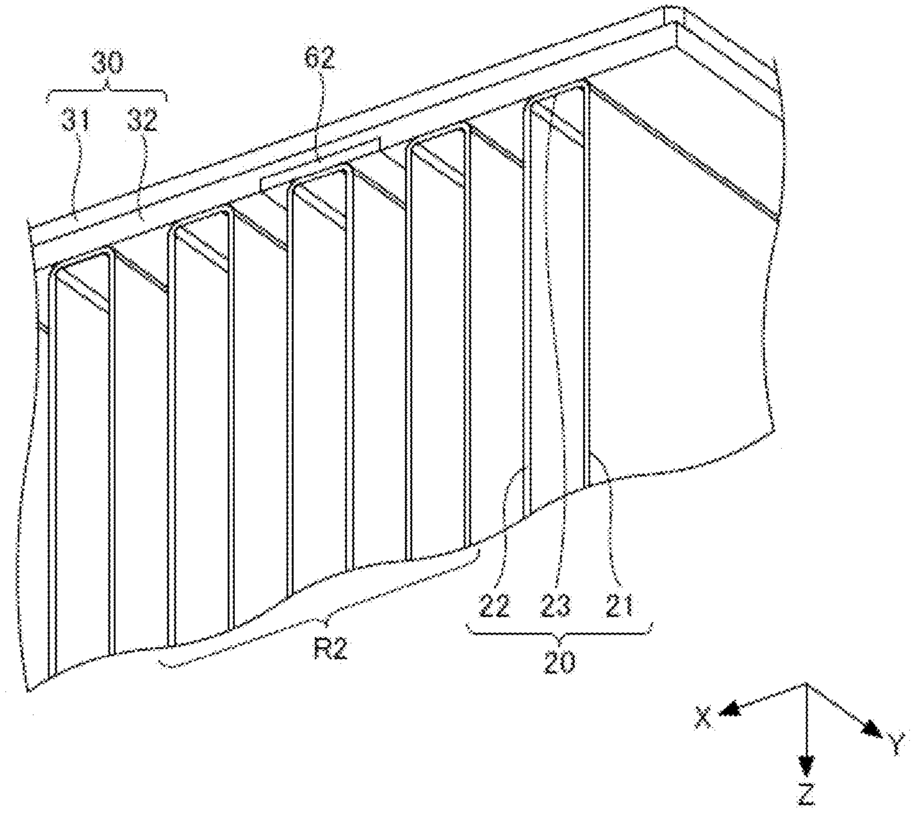
FIG. 14 is a partial perspective view schematically illustrating a light source module according to a modified example 8 of the embodiment.

FIG. 14 is a partial perspective view schematically illustrating a light source module according to a modified example 8 of the present embodiment, and partially illustrates an attachment portion and heat dissipation units. In a light source module 1H illustrated in FIG. 14, a member 62 having a higher thermal conductivity than that of the heat dissipation units 20 is disposed in contact with the coupling portion(s) 23 of the heat dissipation unit(s) 20 located in the second region R2. The member 62 is elongated in the Y direction. When the heat dissipation units 20 are formed of aluminum, examples of the member 62 include a graphite sheet, a heat plate, and a copper plate.

With the configuration of the modified example 8, heat generated in the first region R1 can be further spread in the +Y direction and the −Y direction from the vicinity of the light source unit 10, and thus heat generated in the first region R1 can be efficiently dissipated from the second region R2.

Figure 15:
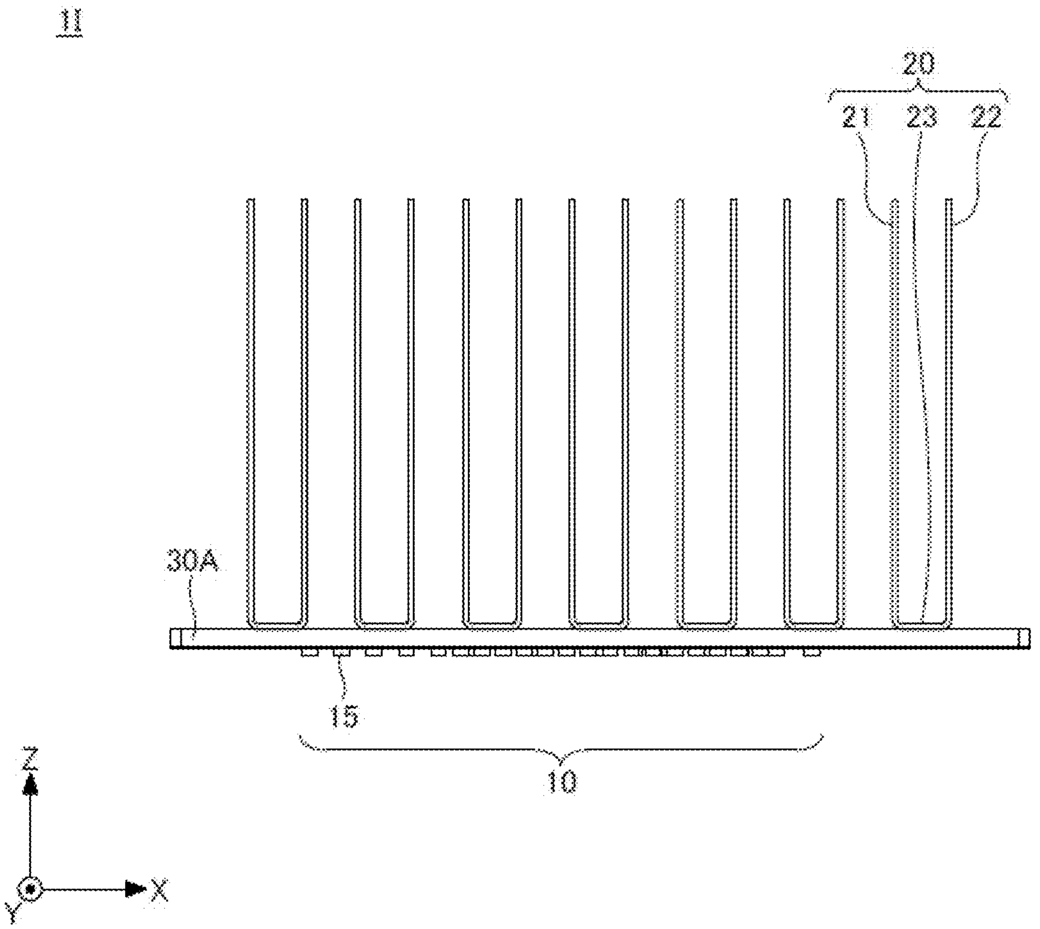
FIG. 15 is a top view schematically illustrating a light source module according to a modified example 9 of the embodiment.

FIG. 15 is a top view schematically illustrating a light source module according to a modified example 9 of the present embodiment. A light source module 1I illustrated in FIG. 15 is different from the light source module 1 in that an attachment portion 30A is provided instead of the attachment portion 30. The attachment portion 30A is a substrate on which the light-emitting portions 15 are mounted, and the heat dissipation units 20 are attached to the opposite side of the surface of the substrate on which the light-emitting portions 15 are mounted. That is, unlike the attachment portion 30, the attachment portion 30A does not include a metal plate.

With the configuration of the modified example 9, because the thermal resistance of the attachment portion 30A can be reduced compared with the case in which the metal plate is included, the heat dissipation of the light source module 1I can be improved. In addition, because the attachment portion 30A does not include a metal plate, it is possible to reduce the weight of the light source module 1I.

After the light-emitting portions 15 are mounted on the substrate serving as the attachment portion 30A, the heat dissipation units 20 can be fixed to the back surface side of the substrate. Therefore, the structure illustrated in FIG. 15 can be achieved without increasing the number of manufacturing steps as compared with the case in which the attachment portion includes a metal plate.

Figure 16:
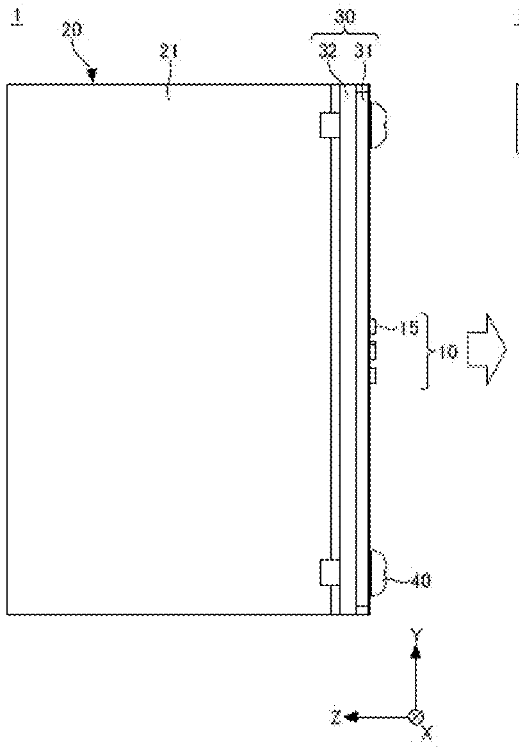
FIG. 16 is a left side view schematically illustrating a light source module according to a modified example 10 of the embodiment.
Figure 16:
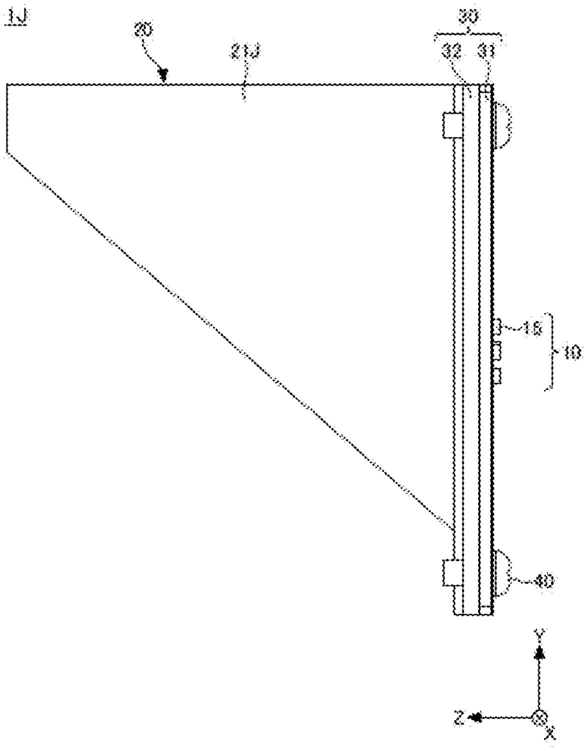

FIG. 16 is a left side view schematically illustrating a light source module according to a modified example 10 of the present embodiment. For comparison, FIG. 16 also illustrates a left side view of the light source module 1. In FIG. 16, the left side of the arrow is the left side view of the light source module 1, and the right side of the arrow is the left side view of a light source module 1J.

In the light source module 1J illustrated in FIG. 16, the shape of a sidewall portion 21J of the heat dissipation unit 20 is different from that of the sidewall portion 21 of the heat dissipation unit 20 of the light source module 1. Specifically, in the light source module 1, the shape of the sidewall portion 21 of the heat dissipation unit 20 is rectangular when viewed from the first direction X. On the other hand, in the light source module 1J, when viewed from the first direction X, the sidewall portion 21J has a shape including a region in which the length gradually decreases from one side (Y+ side) to the other side (Y-side) in the second direction Y.

In the example of FIG. 16, the sidewall portion 21J of the light source module 1J has a trapezoidal shape having an upper base and a lower base both being parallel to the Y direction when viewed from the first direction X. In the light source module 1J, a sidewall portion facing the sidewall portion 21J has substantially the same shape as the sidewall portion 21J.

When the light source module 1J is used as a light source of a vehicular headlight, it is preferable to dispose the light source module 1J such that the wider side of the sidewall portion 21J in the third direction Z is located on the upper side of the vehicle. In the vehicle, heat is transferred from the lower side to the upper side by natural convection. Therefore, by increasing the area of the sidewall portion 21J on the upper side to which heat transfers, heat dissipation can be improved. On the other hand, by narrowing the width of the sidewall portion 21J in the third direction Z on the lower side where the influence on the heat dissipation is small, the area of the sidewall portion 21J can be made smaller than the area of the sidewall portion 21 when viewed from the first direction X. Thus, the weight of the heat dissipation unit 20 can be reduced while maintaining the heat dissipation property.

Figure 17:
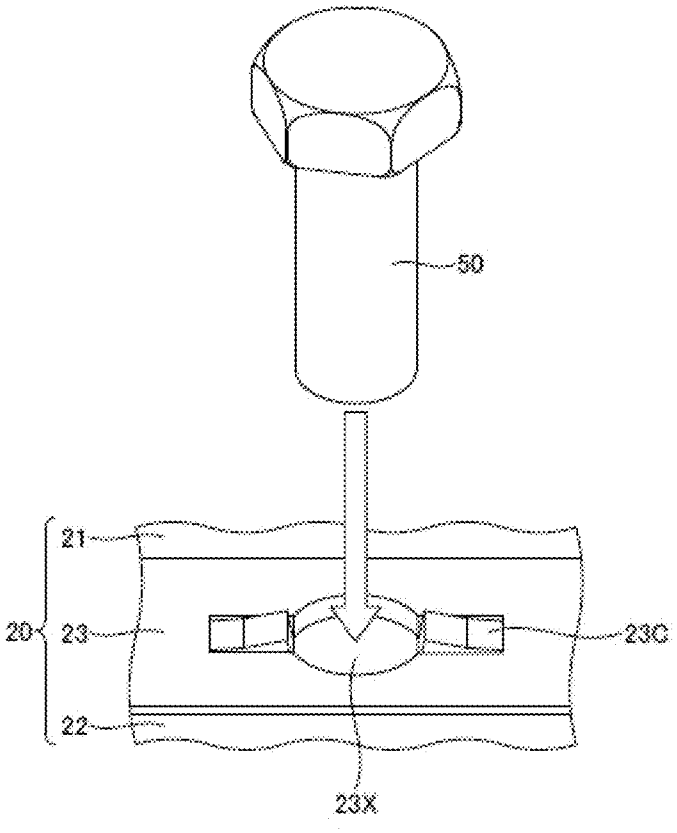
FIG. 17 is a perspective view (part 1) illustrating the structure of an attachment portion of a heat dissipation unit.

FIG. 17 is a perspective view (part 1) illustrating the structure of the attachment portion of the heat dissipation unit. As illustrated in FIG. 17, a through hole 23X used when the heat dissipation unit 20 is attached to the attachment portion is provided in the coupling portion 23. A pair of protruding portions 23C facing each other across the center of the through hole 23X are directed to the outside of the through hole 23X of the coupling portion 23.

The protruding portions 23C protrude toward the side where the rivet 50 is inserted from the surface of the coupling portion 23 located around the protruding portions 23C. The protruding portions 23C can be elastically deformed in the arrow direction in which the rivet 50 is inserted and in the direction opposite to the arrow direction. When the rivet 50 is inserted into the through hole 23X from the arrow direction and the heat dissipation unit 20 is attached to the attachment portion, the protruding portions 23C move in the arrow direction and a force is applied to the head part of the rivet 50 in the direction opposite to the arrow direction. It is preferable that the heat dissipation unit 20 including the protruding portions 23C be formed of an elastic material such as beryllium copper.

For example, in a case in which the heat dissipation unit 20 and the attachment portion are formed of different materials, the deformation amounts of the heat dissipation unit 20 and the attachment portion due to a temperature change are different from each other due to a difference in linear expansion coefficient therebetween. In addition, in a case in which the heat dissipation unit 20 and the attachment portion are formed of the same material but have different plate thicknesses from each other, deformation amounts of the heat dissipation unit 20 and the attachment portion due to a temperature change are different from each other. In these cases, there is a likelihood that the pressure applied by the rivet 50 may decrease due to a temperature change. However, by providing the protruding portions 23C, because the protruding portions 23C are elastically deformed, it is possible to reduce the likelihood that the pressure applied by the rivet 50 may decrease due to the temperature change.

Figure 18:
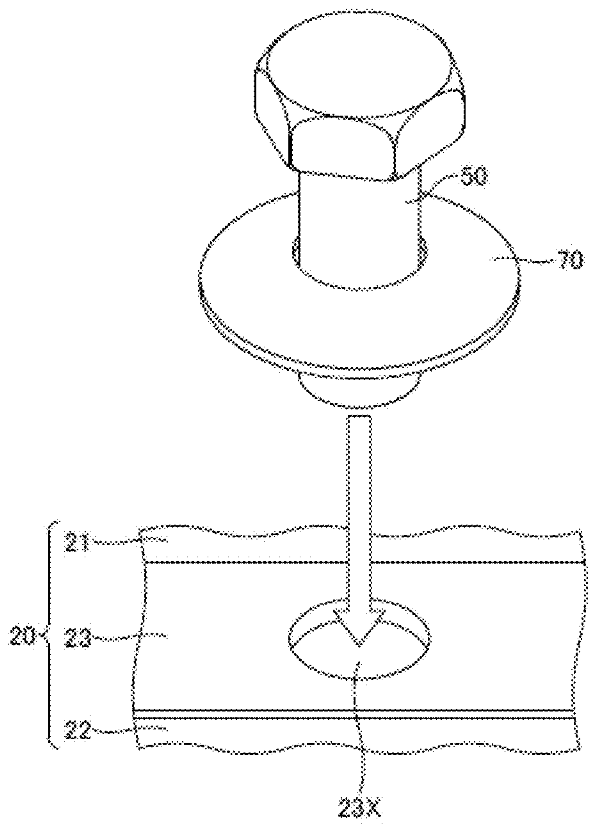
FIG. 18 is a perspective view (part 2) illustrating the structure of the attachment portion of the heat dissipation unit.

FIG. 18 is a perspective view (part 2) illustrating the structure of the attachment portion of the heat dissipation unit. As illustrated in FIG. 18, a washer 70 may be provided with the rivet 50 to fix the heat dissipation unit 20 and the attachment portion. Also in this case, it is possible to reduce the likelihood that the pressure applied by the rivet 50 may decrease due to a temperature change.

The embodiments illustrated in FIGS. 6 to 16 can be combined as necessary. The embodiments illustrated in FIGS. 17 and 18 can be applied to any of the light source modules.

Preferred embodiments and the like have been described in detail above. However, the disclosure is not limited to the above-described embodiments and the like, and various modifications and substitutions can be made to the above-described embodiments and the like without departing from the scope described in the claims.

What is claimed is:

1. A light source module comprising:

an attachment portion;

a light source unit comprising a plurality of light-emitting portions arranged on a surface of the attachment portion so as to form a laterally long shape elongated in a first direction when viewed from a light-emitting surface side of a light-emitting portion of the light-emitting portions; and a plurality of heat dissipation units formed of a metal material, wherein the heat dissipation units are individually attachable to the attachment portion, the heat dissipation units are attached to an opposite surface of the attachment portion with respect to the surface on which the light-emitting portions are arranged, each of the heat dissipation units comprises, two sidewall portions facing each other at a predetermined interval, and a coupling portion coupling end portions of the sidewall portions on a same side to each other, the coupling portion of each of the heat dissipation units is attached to the attachment portion so as to be elongated in a second direction perpendicular to the first direction when viewed from the light-emitting surface side of the light-emitting portion, the plurality of light-emitting portions are configured to be driven individually or in groups, the light source unit comprises a structure having a first region and a region other than the first region, light of higher output being extractable from the first region than from the region other than the first region, the plurality of heat dissipation units comprise a second region and a peripheral region arranged adjacent to each other, the second region having higher heat dissipation than the peripheral region, and the first region and the second region overlap each other in part when viewed from the light-emitting surface side of the light-emitting portion.

2. The light source module according to claim 1, wherein each of the heat dissipation units is U-shaped when viewed from the second direction.

3. The light source module according to claim 1, wherein, in each of the heat dissipation units, surfaces of the sidewall portions facing each other are perpendicular to the first direction.

4. The light source module according to claim 1, wherein the attachment portion comprises a heat dissipation member disposed in a region corresponding to the second region.

5. The light source module according to claim 4, wherein the heat dissipation member is a heat pipe located between adjacent ones of the heat dissipation units in the second region.

6. The light source module according to claim 4, wherein the heat dissipation member has a higher thermal conductivity than the heat dissipation units, the heat dissipation member being in contact with the coupling portion of a heat dissipation unit located in the second region of the heat dissipation units.

7. The light source module according to claim 1, wherein a heat dissipation unit located in the second region of the heat dissipation units is formed of a material having a higher thermal conductivity than a heat dissipation unit located in the peripheral region of the heat dissipation units.

8. The light source module according to claim 1, wherein each of the heat dissipation units is formed by bending a single plate-shaped metal member, and a thickness of a heat dissipation unit located in the second region of the heat dissipation units is thicker than a thickness of a heat dissipation unit located in the peripheral region of the heat dissipation units.

9. The light source module according to claim 1, wherein an interval between adjacent units in the second region of the heat dissipation units is narrower than an interval between adjacent ones in the peripheral region of the heat dissipation units.

10. The light source module according to claim 1, wherein a plurality of heat dissipation units located in the second region of the heat dissipation units comprise a first heat dissipation unit and a second heat dissipation unit in which an interval between the sidewall portions adjacent to each other of the second heat dissipation unit is narrower than an interval between the sidewall portions adjacent to each other of the first heat dissipation unit, and the second heat dissipation unit is disposed between the sidewall portions facing each other of the first heat dissipation unit so as to overlap the first heat dissipation unit.

11. The light source module according to claim 1, wherein the sidewall portions of a heat dissipation unit located in the second region of the heat dissipation units have protrusions and recessions on surfaces of the sidewall portions.

12. The light source module according to claim 1, wherein the attachment portion is a substrate on which the light-emitting portions are mounted, and the heat dissipation units are attached to a surface of the substrate opposite to a surface on which the light-emitting portions are mounted.

13. The light source module according to claim 1, wherein the attachment portion comprises a substrate on which the light-emitting portions are mounted, and a metal plate located on an opposite side of a surface of the substrate on which the light-emitting portions are mounted, and the heat dissipation units are attached to the metal plate.

14. The light source module according to claim 1, wherein when viewed in the first direction, the sidewall portions comprise a region in which a length gradually decreases from one side to another side in the second direction.

* * * * *